Jan. 6, 1959  J. S. ROSCOE ET AL  2,867,498
METHOD FOR THE SEPARATION OF LITHIUM ALUMINUM
HYDRIDE FROM ALUMINUM HYDRIDE
Filed June 15, 1955
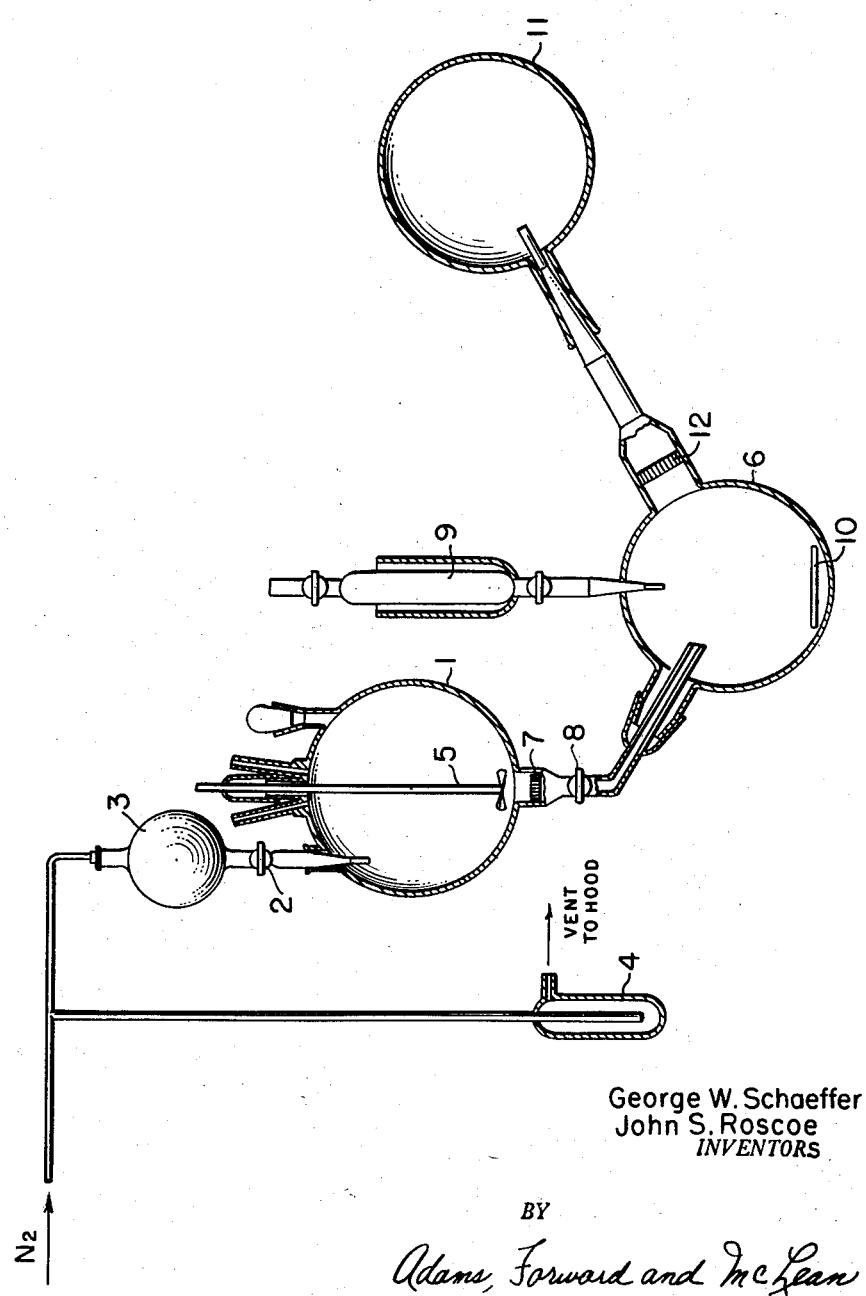
George W. Schaeffer
John S. Roscoe
*INVENTORS*
BY
*Adams, Forward and McLean*
ATTORNEYS

United States Patent Office 2,867,498
Patented Jan. 6, 1959

2,867,498

METHOD FOR THE SEPARATION OF LITHIUM ALUMINUM HYDRIDE FROM ALUMINUM HYDRIDE

John S. Roscoe, Tonawanda, N. Y., and George W. Schaeffer, St. Louis, Mo., assignors, by mesne assignments, to Olin Mathieson Chemical Corporation, a corporation of Virginia Application June 15, 1955, Serial No. 515,726

3 Claims. (Cl. 23—14)

Our invention relates to the production of solid addition products of lithium aluminum hydride and lower tertiary alkyl amines. Our invention relates further to the use of the novel addition products, by thermal decomposition thereof, to effect purification of lithium aluminum hydride and lower tertiary alkyl amines.

Lower tertiary alkyl amines, such as trimethyl amine, frequently have associated with them impurities, such as water, ammonia, primary amines or secondary amines. In one aspect, our invention provides a means whereby lower tertiary alkyl amines which have one or more of the aforementioned impurities in admixture with them can be obtained in a purer form. This purification can be accomplished in accordance with this aspect of our invention by reacting the lower tertiary alkyl amine while the impurity or impurities are in admixture with it with sufficient lithium aluminum hydride to form a 1:1 molar addition product of the lower tertiary alkyl amine and the lithium aluminum hydride in solid form. A sufficient excess of lithium aluminum hydride is provided to react with all of the impurities in the tertiary amine and to furnish, in addition, one mole of lithium aluminum hydride for each mole of tertiary amine present in the impure amine charged. A further excess of lithium aluminum hydride is not harmful and some may be added to insure that ample is present. However, further excess appears unnecessary.

The addition product can be formed in various ways, for example, by contacting the gaseous lower tertiary alkyl amine with the solid lithium aluminum hydride or by passing the lower tertiary alkyl amine in gaseous form into a solution of the lithium aluminum hydride in a suitable dialkyl ether. When the latter expedient is used, the addition product formed is insoluble in the ether and separates therefrom in the form of a precipitate. The addition product which is formed is readily separated into its original lithium aluminum hydride and lower tertiary alkyl amine components by simple warming. Thus, the addition product is a convenient source of the lower tertiary alkyl amine in a highly pure form. The impurities in the charged tertiary amine may form other reaction products soluble or insoluble in ether but none of these appear to be products which subsequently can regenerate by thermal treatment any tertiary amine or volatile materials to contaminate it. Thus by evacuation of any volatile by-products at a low temperature and subsequent warming of the residual addition product, substantially pure tertiary amine is obtained.

In another aspect, our invention provides improved means whereby lithium aluminum hydride can be purified with respect to the impurities it usually contains when prepared by reacting lithium hydride and aluminum chloride in the known manner. The usual impurities in lithium aluminum hydride include aluminum hydride, lithium hydride, aluminum chloride, aluminum metal and lithium metal. Ether extraction of the impure product is known to eliminate all of these impurities except aluminum hydride which dissolves with lithium aluminum hydride in the ether. Both are recovered together from the ether solution. To eliminate the aluminum hydride according to this aspect of our invention, the mixture of lithium aluminum hydride and aluminum hydride in solution in a lower dialkyl ether is reacted with a sufficient amount of a lower tertiary alkyl amine to convert both the hydrides to 1:1 addition compounds. The aluminum hydride:tertiary amine compound remains dissolved in the ether while the 1:1 addition compound of lithium aluminum hydride and tertiary amine precipitates. Separation of the solid from the solution, for example, by filtering, yields the solid addition product which can be thermally decomposed to form substantially pure lithium aluminum hydride free from aluminum hydride.

We have further found that the ether soluble aluminum hydride:tertiary amine addition compound reacts with lithium hydride to form the same lithium aluminum hydride:tertiary amine addition compound as prepared from these two components directly. A further embodiment of our invention, therefore, in the preparation of pure lithium aluminum hydride comprises reacting lithium hydride with the aluminum hydride:tertiary amine addition compound to form further quantities of the lithium aluminum hydride:tertiary amine addition compound and its dissociation into purified lithium aluminum hydride. The conversion may be accomplished by the addition of lithium hydride to the ether solution of the aluminum hydride:tertiary amine addition compound which may contain or have been filtered from the insoluble lithium aluminum hydride:tertiary amine addition compound. Further quantities of the insoluble addition compound are thus precipitated and may be separated and decomposed to form pure lithium aluminum hydride.

Because the aluminum hydride:tertiary amine addition compound is appreciably volatile, a modified procedure is also advantageous. The ether extract of impure lithium aluminum hydride containing aluminum hydride is treated by the introduction of the tertiary amine and the excess amine is removed by distillation through a fractionating column containing lumps of lithium hydride as part of the packing. The volatile aluminum hydride:tertiary amine compound in contact with the lithium hydride in the fractionating column is converted to the lithium aluminum hydride:tertiary amine compound and the distillate of tertiary amine is free of aluminum hydride. Ether is subsequently removed by fractionation leaving pure lithium aluminum hydride as a residue.

The following examples illustrate in detail various embodiments falling within the broad scope of our invention.

Example 1

A commercial sample of trimethyl amine containing not more than 0.5 percent of monomethylamine, 1.5 percent of dimethylamine and 4.8 percent of water by weight was purified by the formation of the 1:1 addition compound with lithium aluminum hydride in the following manner: Six grams of commercial lithium aluminum hydride was powdered and was then transferred to a tube of 50 ml. capacity. This tube was fitted with a 19/38 taper (inner member) which was attached to a vacuum apparatus and was evacuated. To prevent the fine lithium aluminum hydride powder from being swept into the vacuum system, a plug of glass wool was inserted into the neck of the 19/38 taper before attachment to the vacuum system. After the evacuation had been completed, two gaseous liters (4.8 grams) of the commercial trimethylamine was condensed into the tube using a −63.5° C. bath and the mixture of lithium aluminum hydride and trimethylamine was maintained for 2½ hours at this temperature. After this time, the cooling bath was removed and the mixture was permitted to stand overnight at room temperature. Any non-condensable gases which were formed as a result of chemical reaction between the lithium aluminum hydride and the impurities associated with the trimethylamine were separated from the mixture of excess lithium aluminum hydride and the solid 1:1 mole addition product of lithium aluminum hydride and trimethylamine present by maintaining the tube at liquid nitrogen temperature and evacuating to a pressure of about $10^{-3}$ mm. Hg. The tube was warmed to room temperature at a pressure of about $10^{-2}$ mm. Hg, the volatile products being condensed in a trap kept at $-196°$ C. The lithium aluminum hydride addition product was easily decomposed, yielding trimethylamine contaminated with minor proportions of the aluminum hydride complex. The trimethylamine was separated from the small amount of trimethylamine-aluminum hydride complex by fractionation and collected as a liquid in a $-63.5°$ C. trap. Recovery of purified trimethylamine was about 90 to 95 percent of the starting material. It had a vapor pressure of 685 mm. of mercury at 0° C. compared with a literature value of 680.5 mm. Addition of diborane produced no hydrogen indicating the absence of water.

*Example II*

22½ grams of commercial lithium aluminum hydride of about 38 percent purity by weight and containing considerable amounts of aluminum hydride as an impurity was powdered and placed in reaction flask 1 of the drawing which had been first flushed with dry nitrogen. Anhydrous diethyl ether (about 300 ml. or 215 grams) was then introduced into the flask through stopcock 2 from bulb 3. Any gases which were evolved during this operation were permitted to bubble off through a mercury bubbler 4. Stirring of the solution was accomplished by means of a small laboratory motor and mercury sealed stirrer 5. The ether solution of the aluminum hydride and lithium aluminum hydride was drawn off into reaction bulb 6 through a 20 mm. coarse fritted disc 7 by opening stopcock 8. There remained on the fritted disc various impurities found in the mixture of the hydrides. The mixture of the two hydrides in reaction bulb 6 was then cooled to 0° C. and anhydrous trimethylamine was added in liquid form through the condensing chamber 9 until precipitation appeared to be complete. The condensing chamber consisted of an inner tube of 20 mm. tubing with an outer jacket of 35 mm. tubing. It was maintained at a low temperature by placing solid carbon dioxide in the outer jacket. The solution in bulb 6 was stirred continuously during the addition of the trimethyl amine by means of a magnetic stirrer and a glass sealed stirring bar 10 placed in the reaction bulb before beginning the reaction. After the precipitation of the 1:1 molar addition product of the lithium aluminum hydride and trimethylamine was complete, the reaction flask 6 and receiver 11 were rotated through an arc of 180°, thus allowing the solution to filter through a 30 mm. coarse fritted disc 12. The ether-insoluble lithium aluminum hydride-trimethylamine addition product was dissociated by pumping the trimethylamine off at about $10^{-2}$ mm. Hg pressure through a trap cooled by liquid nitrogen to condense the trimethylamine while the complex being dissociated was maintained at room temperature. The lithium aluminum hydride remaining in flask 6 was of better than 99 percent purity. The yield was about 5 grams or about 60 percent of the lithium aluminum hydride contained in the starting material. The yield can be improved by more thorough ether extraction. A particularly poor sample of lithium aluminum hydride was intentionally selected for this example in order to demonstrate the advantage of the method.

*Example III*

Two 50 ml. round-bottom flasks with 19/38 standard taper joints were connected by a length of 20 mm. tubing bent at a right angle and having a fritted glass filter near the middle of its length. The large bore bulb also carried a connection to a high vacuum system. One flask was charged with 5.4138 grams of lithium aluminum hydride and the system was evacuated. Anhydrous diethyl ether (25 ml.) was introduced onto the lithium aluminum hydride by means of a side tube on the flask and a liquid nitrogen bath surrounding the flask. The evacuated system was closed and warmed to room temperature where it was maintained for several hours with occasional shaking. The solution was filtered through the fitted glass plate by tilting the apparatus. Excess trimethylamine was passed through the filtrate until precipitation appeared complete. The mixture was filtered and the solid freed from ether by evacuation at low pressure ($10^{-2}$ mm. Hg) and low temperature ($-196°$ C.). Trimethylamine was determined by evacuation at room temperature and condensation of the liquid at liquid nitrogen temperature. The residual lithium aluminum hydride was analyzed for aluminum and hydrogen by known methods. The solid addition compound of lithium aluminum hydride and trimethylamine contained 1.47 millimoles of Al, 5.76 millimoles of H, and 1.42 millimoles of trimethylamine, corresponding to molar ratios of 1:3.92:0.96. Another sample similarly prepared was analyzed for lithium, aluminum and hydrogen. The molar ratios were 1:1.01:3.91. Hence, the formula for the addition compound is $LiAlH_4 \cdot (CH_3)_3N$.

*Example IV*

A fractionation column packed with lithium hydride pebbles was constructed. A diethyl ether solution of the aluminum hydride-trimethylamine addition compound was fractionated in the column to obtain trimethylamine of approximately 90 percent purity at the top of the column (no active hydrogen) and a solution of lithium aluminum hydride in ether of approximately 92 percent purity (based on hydrogen and lithium analysis) at the bottom of the column. No trimethylamine was evident in the latter product.

Various modifications can be made in the procedure of the specific examples to provide other embodiments which fall within the broad scope of our invention. Thus, where it is desired to purify the lower tertiary alkyl amine, such tertiary alkyl amine can be, for example, one in which each alkyl group contains from 1 to 3 carbon atoms, such as trimethylamine, dimethyl ethyl amine, methyl diethyl amine, tri-n-propyl amine, dimethyl-n-propyl amine and the like, as well as the trimethylamine utilized in Example I. Such tertiary amines can have associated with them one or more impurities such as water, ammonia, primary alkyl amines, or secondary alkyl amines to the extent of about 10 percent by weight, and where the impurities are amines they will have from 1 to 3 carbon atoms in each alkyl group, for example, monomethyl amine, dimethyl amine, monoethyl amine, diethyl amine, monoisopropyl amine, diisopropyl amine, methyl isopropyl amine, etc.

Where our invention is employed for the purpose of purifying lithium aluminum hydride containing aluminum hydride as an impurity, the amount of aluminum hydride present will generally be within the range of from about ½ to about 10 percent by weight, depending upon the precise fashion in which the lithium aluminum hydride has been prepared. In place of the trimethylamine employed in Example II it is also possible to use other tertiary alkyl amines containing from 1 to 3 carbon atoms in each alkyl radical, for example, triethyl amine, tri-n-propyl amine, methyl diethyl amine, ethyl dimethyl amine, dimethyl-n-propyl amine, etc. In place of the diethyl ether used in Example II there can be added other dialkyl ethers containing from 1 to 3 carbon atoms in each alkyl radical such as dimethyl ether, methyl ethyl ether, methyl n-propyl ether, di-n-propyl ether and the like.

We claim:
1. A method for the separation of lithium aluminum hydride from aluminum hydride in admixture therewith, the aluminum hydride being present in an amount less than about 10% by weight, which comprises contacting the mixture of lithium aluminum hydride and aluminum hydride with a molar amount, based on the moles of aluminum hydride and lithium aluminum hydride present, of a lower tertiary alkyl amine while the reactants are in admixture with a lower dialkyl ether thereby forming a precipitate consisting of 1:1 molar of addition product the lithium aluminum hydride and the lower tertiary alkyl amine, and separating the precipitate from the reaction mixture.

2. A method according to claim 1 in which said addition product is decomposed under vacuum to separate its lower tertiary amine component from its lithium aluminum hydride component.

3. A method according to claim 1 in which said lower tertiary alkyl amine is trimethyl amine and in which said lower dialkyl ether is diethyl ether.

References Cited in the file of this patent
UNITED STATES PATENTS

| | | |
|---|---|---|
| 2,656,243 | Bragdon | Oct. 20, 1953 |
| 2,680,059 | Bragdon | Jan. 1, 1954 |

OTHER REFERENCES

Wiberg: Ber. 77A, page 78 (1944).
Finholt et al.: Jour. Am. Chem. Soc., vol. 69, 1199 (1947).